United States Patent
Yun (10) Patent No.: US 8,284,414 B2
(45) Date of Patent: Oct. 9, 2012

(54) IMAGE FORMING SYSTEM AND MANAGING METHOD THEREOF

(75) Inventor: Eun-kyung Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 849 days.

(21) Appl. No.: 12/388,582

(22) Filed: Feb. 19, 2009

(65) Prior Publication Data

US 2009/0237702 A1 Sep. 24, 2009

(30) Foreign Application Priority Data

Mar. 24, 2008 (KR) .................. 10-2008-0026957

(51) Int. Cl.
*G06F 3/12* (2006.01)
(52) U.S. Cl. ................ 358/1.13; 358/1.15; 709/220
(58) Field of Classification Search ............. None
See application file for complete search history.

(56) References Cited

U.S. PATENT DOCUMENTS

| | | | |
|---|---|---|---|
| 5,978,565 A * | 11/1999 | Ohran et al. | 714/13 |
| 2002/0105675 A1* | 8/2002 | Toyofuku | 358/1.15 |
| 2002/0156984 A1* | 10/2002 | Padovano | 711/148 |
| 2003/0160993 A1* | 8/2003 | Kang | 358/1.15 |
| 2004/0170460 A1* | 9/2004 | Mokuya et al. | 400/76 |
| 2004/0194013 A1* | 9/2004 | Nishikawa | 715/500 |
| 2004/0215759 A1* | 10/2004 | Takahashi et al. | 709/223 |
| 2007/0101192 A1* | 5/2007 | Kutan et al. | 714/16 |
| 2012/0062952 A1* | 3/2012 | Nishikawa | 358/1.15 |

* cited by examiner

*Primary Examiner* — Satwant Singh
(74) *Attorney, Agent, or Firm* — Stanzione & Kim, LLP (57) ABSTRACT

A managing method of an image forming system having at least one image forming apparatus including a first image forming apparatus, and a plurality of servers including a first server and managing the first image forming apparatus, the managing method includes determining whether the first server operates normally, requesting the plurality of server except the first server to manage the first image forming apparatus, if the first server operates abnormally, and allowing a second server among the plurality of servers except the first server to manage the first image forming apparatus in response to the request.

13 Claims, 7 Drawing Sheets

IMAGE FORMING SYSTEM AND MANAGING METHOD THEREOF

CROSS-REFERENCE TO RELATED APPLICATIONS

This application claims priority under 35 U.S.C. §119(a) from Korean Patent Application No. 10-2008-0026957, filed on Mar. 24, 2008 in the Korean Intellectual Property Office, the disclosure of which is incorporated herein in its entirety by reference.

BACKGROUND OF THE INVENTION

1. Field of the Invention

The present general inventive concept relates to an image forming system and a managing method thereof, and more particularly, to an image forming system improved in stability of a server and a method of managing the same.

2. Description of the Related Art

Figure 1:
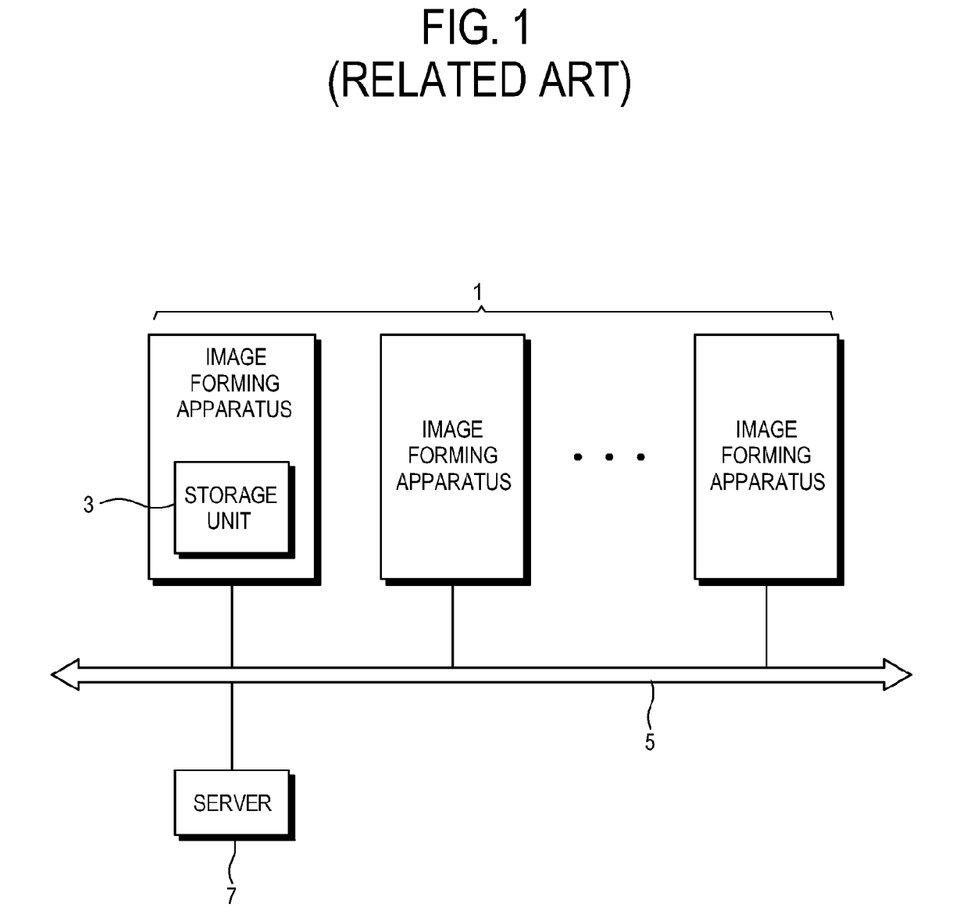
FIG. 1 is a schematic view of a conventional image forming system.

FIG. 1 is a schematic view of a conventional image forming system. As illustrated therein, a conventional image forming system includes a plurality of image forming apparatuses 1 to perform copying, scanning, printing, facsimileing, etc.; and a server 7 connected to the plurality of image forming apparatuses 1 through a network 5 and managing operations of the plurality of image forming apparatuses 1. Here, the server 7 and the image forming apparatus 1 managed by the server 7 have a relationship of 1:N, where N is a natural number greater than 2. Thus, the plurality of servers cannot take job records from one apparatus at the same time.

Each of the image forming apparatuses 1 includes a storage unit 3 to store job indexes and job records when copying, scanning, printing, facsimileing, etc., are implemented.

The server 7 collects the job indexes and the job records from the plurality of image forming apparatuses 1, and manages the image forming apparatuses 1 so that the storage unit 3 can secure a storage space.

However, the conventional image forming system with the foregoing configuration is not prepared for unexpected shutdown of the server 7. When the server 7 is shut down, the job records newly generated every time the image forming apparatus 1 performs jobs are accumulatively stored in the storage unit 3 while pushing out the job records previously stored in the storage unit 3 if the storage unit 3 lacks a storage space. Thus, when the server 7 is shut down, the storage unit 3 cannot give information such as the job records or the like to the server 7, the job records stored in the storage unit 3 may be lost.

SUMMARY OF THE INVENTION

The present general inventive concept provides an image forming system and a managing method thereof, in which, when a managing server for an image forming apparatus commits an error, the image forming apparatus is managed by another server connected through a network, so that the managing server can be improved in stability.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept can be achieved by providing a managing method of an image forming system including at least one image forming apparatus including a first image forming apparatus, and a plurality of servers including a first server and managing the first image forming apparatus, the managing method including determining whether the first server operates normally, requesting the plurality of servers, except the first server, to manage the first image forming apparatus, if the first server operates abnormally, and allowing a second server among the plurality of servers, except the first server, to manage the first image forming apparatus in response to the request.

At least one of the first server and at least one image forming apparatus might manage by the first server makes the request for the management.

If the first server may make the request for the management, the second server informs at least one image forming apparatus managed by the first server of an operation state of the first server.

The managing method may further include the second server notifying a manager that the first server operates abnormally.

The managing method may further include transferring a job record collected by the second server to the first server, if the first server is recovered.

The transfer of the job record may include informing the plurality of servers including the second server of recovery of the first server, the second server responding to the first server, the first server requesting the job record from the second server, and the second server transferring the job record.

At least one of the first server and the second server informs the plurality of servers that the first server may be recovered.

The foregoing and/or other aspects and utilities of the present general inventive concept can also be achieved by providing a managing method of an image forming system including at least one image forming apparatus including a first image forming apparatus, and a plurality of servers including a first server used as a main server to manage the first image forming apparatus and a second server used as an auxiliary server to manage the first image forming apparatus, the managing method including: determining whether the first server operates normally, requesting the second server to manage the first image forming apparatus, if the first server operates abnormally, and the second server managing the first image forming apparatus in response to the request.

The request may include that the first image forming apparatus or the first server makes the request for the management.

The managing method may further include transferring a job record collected by the second server to the first server, if the first server is recovered.

The managing method may further include informing the first image forming apparatus of recovery of the first server after the first server receives the job record from the second server.

The foregoing and/or other aspects and utilities of the present general inventive concept can also be achieved by providing an image forming system including at least one image forming apparatus including a first image forming apparatus, and a plurality of servers including a first server of managing the first image forming apparatus, at least one of the first image forming apparatus and the first server determining whether the first server operates normally, and requesting the plurality of server except the first server to manage the first image forming apparatus, if the first server operates abnormally, and a second server, among the plurality of servers except the first server, managing the first image forming apparatus in response to the request.

Each image forming apparatus may include an image forming unit to perform at least one of printing, scanning, copying and facsimileing functions, a storage unit to store a job record and a job index of the image forming unit, and a controller to control the image forming unit and the storage unit and to communicate with the plurality of servers, and the controller of the first image forming apparatus controls the storage unit of the first image forming apparatus to delete the job record stored therein after the second server collects the job record from the first image forming apparatus.

The foregoing and/or other aspects and utilities of the present general inventive concept can also be achieved by providing an image forming system including at least one image forming apparatus including a first image forming apparatus, and a plurality of servers including a first server used as a main server to manage the first image forming apparatus and a second server used as an auxiliary server to manage the first image forming apparatus, at least one of the first image forming apparatus and the first server determining whether the first server operates normally, requesting the second server to manage the first image forming apparatus if the first server operates abnormally, and the second server managing the first image forming apparatus instead of the first server.

Each image forming apparatus may include an image forming unit to perform at least one of printing, scanning, copying and facsimileing functions, a storage unit to store a job record and a job index of the image forming unit, and a controller to control the image forming unit and the storage unit and to communicate with the plurality of servers, and the controller of the first image forming apparatus controls the storage unit of the first image forming apparatus to delete the job record stored therein after the second server collects the job record from the first image forming apparatus.

The foregoing and/or other aspects and utilities of the present general inventive concept can also be achieved by providing an image forming system including a plurality of image forming apparatuses, and a plurality of servers coupled to the plurality of image forming apparatuses through a network, and to selectively manage the image forming apparatuses, wherein a server is subsequently selected to manage a respective image forming apparatus when an operation of a server previously assigned to the respective image forming apparatus is determined to be abnormal.

The operation of the previously assigned server may be determined to be abnormal based on the server previously assigned not being able to complete a requested job record collection operation within a predetermined time.

The foregoing and/or other aspects and utilities of the present general inventive concept can also be achieved by providing an image forming system including a plurality of image forming apparatuses, a plurality of servers, and a storage unit coupled through a network, the image forming system including a plurality of job records stored in the storage unit, a controller to request a respective server to obtain one or more job records from the storage unit, and to delete the obtained one or more job records from the storage unit, wherein the controller initiates the respective server request based on a predetermined amount of storage space not being available.

The foregoing and/or other aspects and utilities of the present general inventive concept can also be achieved by providing a computer-readable recording medium having embodied thereon a computer program to execute a method, wherein the method including determining whether a first server operates normally, requesting a plurality of servers, except the first server, to manage a first image forming apparatus, if the first server operates abnormally, and allowing a second server among the plurality of servers, except the first server, to manage the first image forming apparatus in response to the request.

The foregoing and/or other aspects and utilities of the present general inventive concept can also be achieved by providing an image forming apparatus including an image forming unit, and a controller connectable to at least two servers, to receive a command from one of the at least two servers, to control the image forming unit according to the command of the one server, and to receive a second command from the other one of the at least two servers when the one server is not in a normal operation such that the controller controls the image forming unit according to the second command of the other one server.

BRIEF DESCRIPTION OF THE DRAWINGS

These and/or other aspects and utilities of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to like elements throughout. The embodiments are described below so as to explain the present general inventive concept by referring to the figures.

Figure 2:
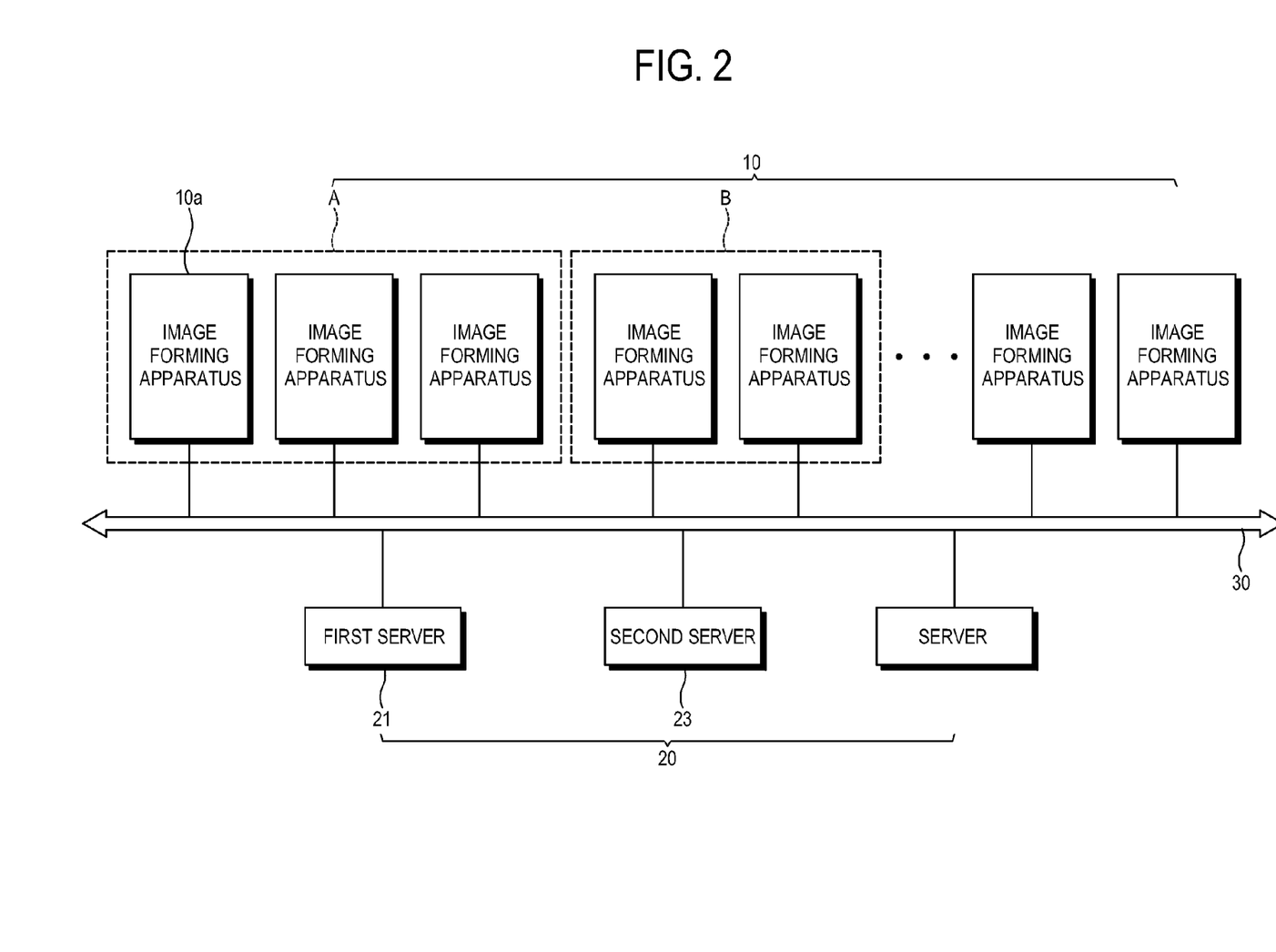
FIG. 2 is a schematic block diagram of an image forming system according to an embodiment of the present general inventive concept.
Figure 3:
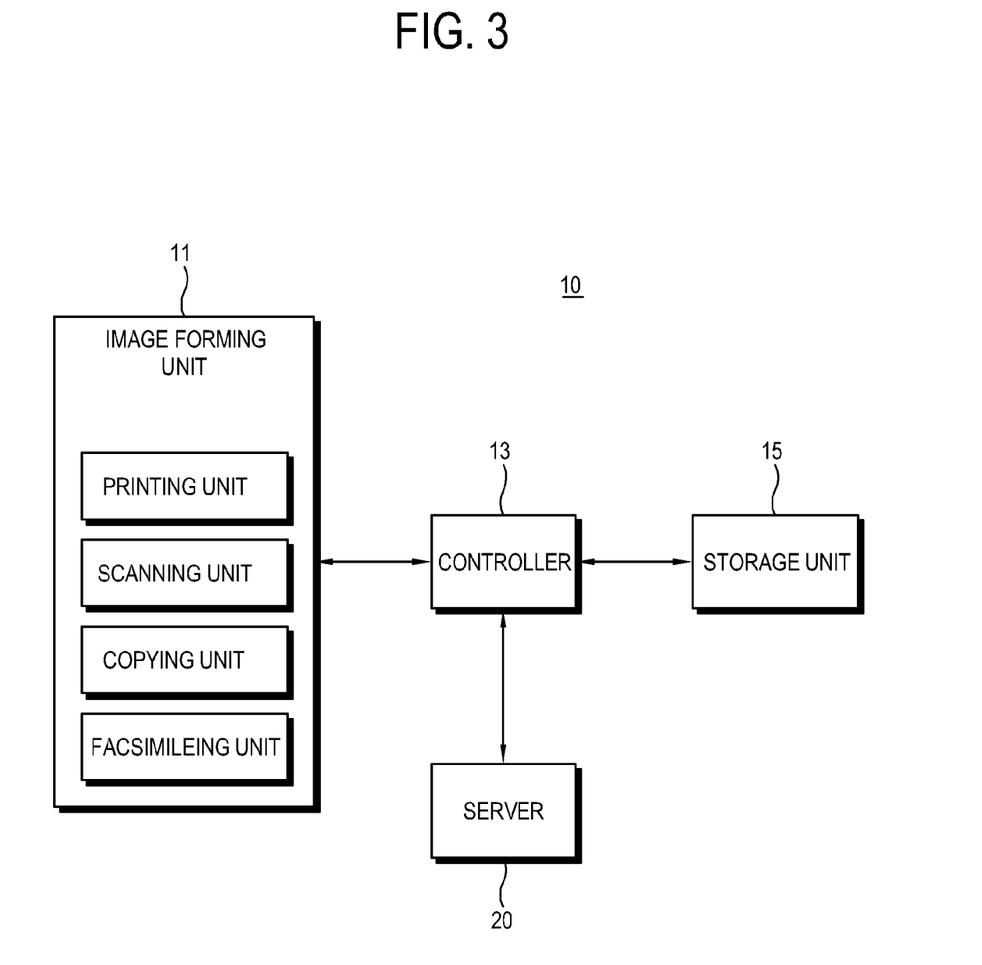
FIG. 3 is a block diagram of an image forming apparatus of FIG. 2.

FIG. 2 is a schematic block diagram of an image forming system according to an embodiment of the present general inventive concept, and FIG. 3 is a block diagram of an image forming apparatus of FIG. 2.

Referring to FIGS. 2 and 3, the image forming system includes at least one image forming apparatus 10, and a plurality of servers 20 to manage the image forming apparatus 10.

The image forming apparatus 10 includes an image forming unit 11, a storage unit 15 to store a job record and a job index of the image forming unit 11, and a controller 13.

The image forming unit 11 includes at least one of a printing unit, a scanning unit, a copying unit and a facsimileing unit, and performs at least one function of printing, scanning, copying and facsimileing functions. For example, the image forming apparatus 10 may be achieved by a multi-function peripheral having at least two functions among the printing, scanning, copying and facsimileing functions.

The storage unit 15 stores the job record and the job index of a job to be performed by the image forming unit 11. Here, the job record contains a file name, a request user name, a job time, a copy number, a job type, etc., of a job-objective document.

If the image forming apparatus 10 is provided in plural, the plurality of servers 20 divisionally manages the plurality of image forming apparatuses 10. For example, if the image forming system is configured as illustrated in FIG. 2, a first server 21 manages a first group of the image forming apparatuses indicated by 'A' and a second server 23 manages a second group of the image forming apparatuses indicated by 'B'. Besides, the image forming apparatuses 10, which do not belong to the first and second groups A and B, are managed by other servers. Here, the server 20 and the image forming apparatuses to be managed by the server 20 have a relationship of 1:N, where N is a natural number. Thus, the plural servers 20 do not perform job management with regard to one image forming apparatus 10 at the same time.

For example, the job management of the first server 21 under a normal state will be described below.

The first server 21 periodically collects the job index and the job record from each image forming apparatus of the first group A, and then requests the job records stored in the storage unit 15 to be deleted in consideration of a storage space of the storage unit 15. Thus, after the collection is completed, the controller 13 deletes the job records stored in the storage unit 15, thereby securing the storage space.

If at least one among the image forming apparatuses of the first group A, e.g., a first image forming apparatus 10a is lacking in the storage space of the storage unit 15, the first image forming apparatus 10a may inform the first server 21 of the lack of the storage space and request the first server 21 to collect the job records before the first server 21 collects the job records. Accordingly, the first server 21 starts to collect the job records, and the job records stored in the storage unit 15 are deleted after the collection is completed, thereby securing the storage space.

Here, the job index is used in determining how far the job records are collected, a deleting range of the job records, etc. Further, a manager of the server 20 treats the collected job records according to certain purposes and uses the collected job records as data to operate the image forming apparatus 10.

Alternatively, if the first server 21 operates abnormally, the first server 21 cannot collect the job records from the first image forming apparatus 10a. Here, the abnormal operation of the first server 21 may be caused by a power-off of the first server 21, network connection error, etc.

In the case that the first server 21 operates abnormally while a first image forming apparatus 11a among the image forming apparatuses of the first group A managed by the first server 21 forms an image, job management under the abnormal operation is as follows.

The first image forming apparatus 10a determines whether the first server 21 operates normally or abnormally. If a determination is made that the first server 21 operates abnormally, another server is requested to manage the first image forming apparatus 10a. Here, whether the first server 21 operates normally or abnormally can be determined by determining whether the first server collects the job records within a predetermined time after the first image forming apparatus 10a requests the first server 21 to collect the job records. Here, the predetermined time may be a default value or may be arbitrarily set by a manager.

Among the servers that receive the management request, a server that responds first, e.g., the second server 23 temporarily manages the first image forming apparatus 10a instead of the first server 21.

Meanwhile, the first server 21 can determine whether the first server 21 operates normally or abnormally. For example, if the first server 21 has some trouble in a function such as collecting the job records, the first server 21 can make a diagnosis in itself and request another server to manage the first image forming apparatus 10a. Then, the new server that undertakes the management, e.g., the second server 23 informs the first image forming apparatus 10a that the first server 21 operates abnormally and temporarily replaced by the new server. In this case, there is no need of separately determining whether the first server 21 operates normally or abnormally.

Further, according to an embodiment of the present general inventive concept, a main server and an auxiliary server may be set with regard to each image forming apparatus in order to prepare for the case that the first server 21 operates abnormally. For example, the first server 21 and the second server 23 may be designated for the first image forming apparatus 10a as the main server and the auxiliary server, respectively. In this case, when the main server operates abnormally, the second server 23 is directly designated for the first image forming apparatus 10a without searching another server to temporarily replace the first server.

The second server 23 manages the first image forming apparatus 10a instead of the first server 21. When the second server 23 collects the job records from the first image forming apparatus 10a, the second server 23 notifies the first image forming apparatus 10a of the collection of the job records. In this case, the controller 13 of the first image forming apparatus 10 controls the storage unit 15 to delete the job records collected by the second server 23.

Further, the second server 23 may notify a manager of the abnormal operation of the first server 21 through E-mail, short message service (SMS), really simple syndication (RSS), etc.

Thereafter, when the first server 21 is recovered from the abnormal state, a recovering process is as follows.

The first server 21 informs the plural servers including the second server 23 of a recovery thereof, thereby searching the second server 23 that manages the first image forming apparatus 10a. That is, when the first server 21 is recovered to come into service, the first server 21 transmits information such as an internet protocol (IP) address and a host name to network. At this time, the servers connected through the network receive the information from the first server 21, and the second server 23 among the servers informs the first server 21 that the second server 23 temporarily manages the first image forming apparatus 10a.

Then, the first server 21 receives and stores job information such as the job record, the job index, etc., of the first image forming apparatus 10a from the second server 23 through a communication interface 30. After the job information related to the first image forming apparatus 10a is completely transmitted from the second server 23, the first server 21 informs the first image forming apparatus 10a that the first server 21 is recovered and completely receives the job information from the second server 23.

Here, the interface 30 between the servers 20 may use an IP broadcast, a service location protocol multicast, an IP range, a web service, etc.

Like the first image forming apparatus 11a, when the first server 21 operates abnormally, other image forming apparatuses that are managed by the first server 21 may be managed by another server such as the second server 23 temporarily designated among the servers that operates normally. Thus, the job information may be temporarily stored in the temporarily-designated server.

Further, the image forming system may provide a user interface for the convenience of a manager's management. As an example of the user interface, there may be a screen to illustrate a list of servers provided on the network, and a screen to illustrate a list of image forming apparatuses managed by each server. Further, there may be a screen to notify the manager of when the server operates abnormally.

In the image forming system with the foregoing configuration, even though the server of managing the image forming apparatus may be under the abnormal state, another server can be used to manage the image forming apparatus, thereby preventing the job records from loss. Thus, the managing server is improved in stability.

Accordingly, the image forming apparatus 11a having an image forming unit to form scan, or transmit an image and a controller to control the image forming unit, can receive a first command from the first server 20 to control the image forming unit and can receive a second command from the second server 23 to control the image forming unit when the first server 20 cannot send the first command to the controller.

Below, a managing method in the image forming system according to an exemplary embodiment of the present general inventive concept will be described with reference to FIGS. 2 through 6.

As illustrated in FIG. 2, the image forming system to which the managing method according to the present exemplary embodiment is applied includes at least one image forming apparatus 10 including the first image forming apparatus 10a, and the plurality of servers 20 including the first server 21 that manages the first image forming apparatus 10a.

Figure 4:
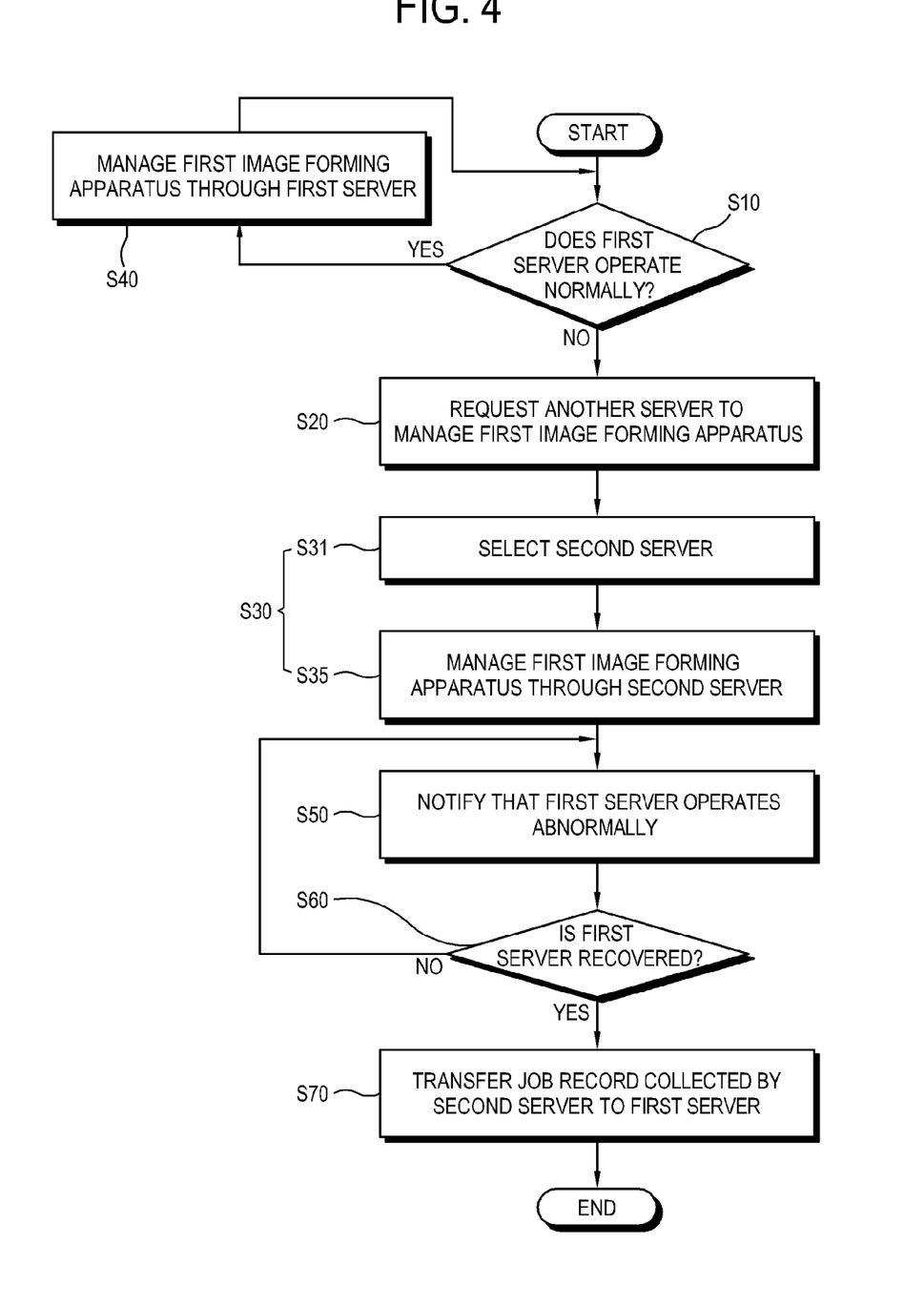
FIG. 4 is a flowchart of managing the image forming system according to an exemplary embodiment of the present general inventive concept.

FIG. 4 is a flowchart of managing the image forming system according to the exemplary embodiment of FIG. 2.

As illustrated therein, the managing method according to the exemplary embodiment of FIG. 2 includes determining whether the first server 21 operates normally (operation S10); requesting another server to manage the first image forming apparatus 10a when the first server 21 make trouble (operation S20); and managing the first image forming apparatus 10a through one among the servers, e.g., the second server 23 except the first server 21 in response to the request (operation S30).

Here, if a determination is made that the first server 21 operates normally, the first server 21 is continuously used in managing the first image forming apparatus 10a (operation S40).

Figure 5:
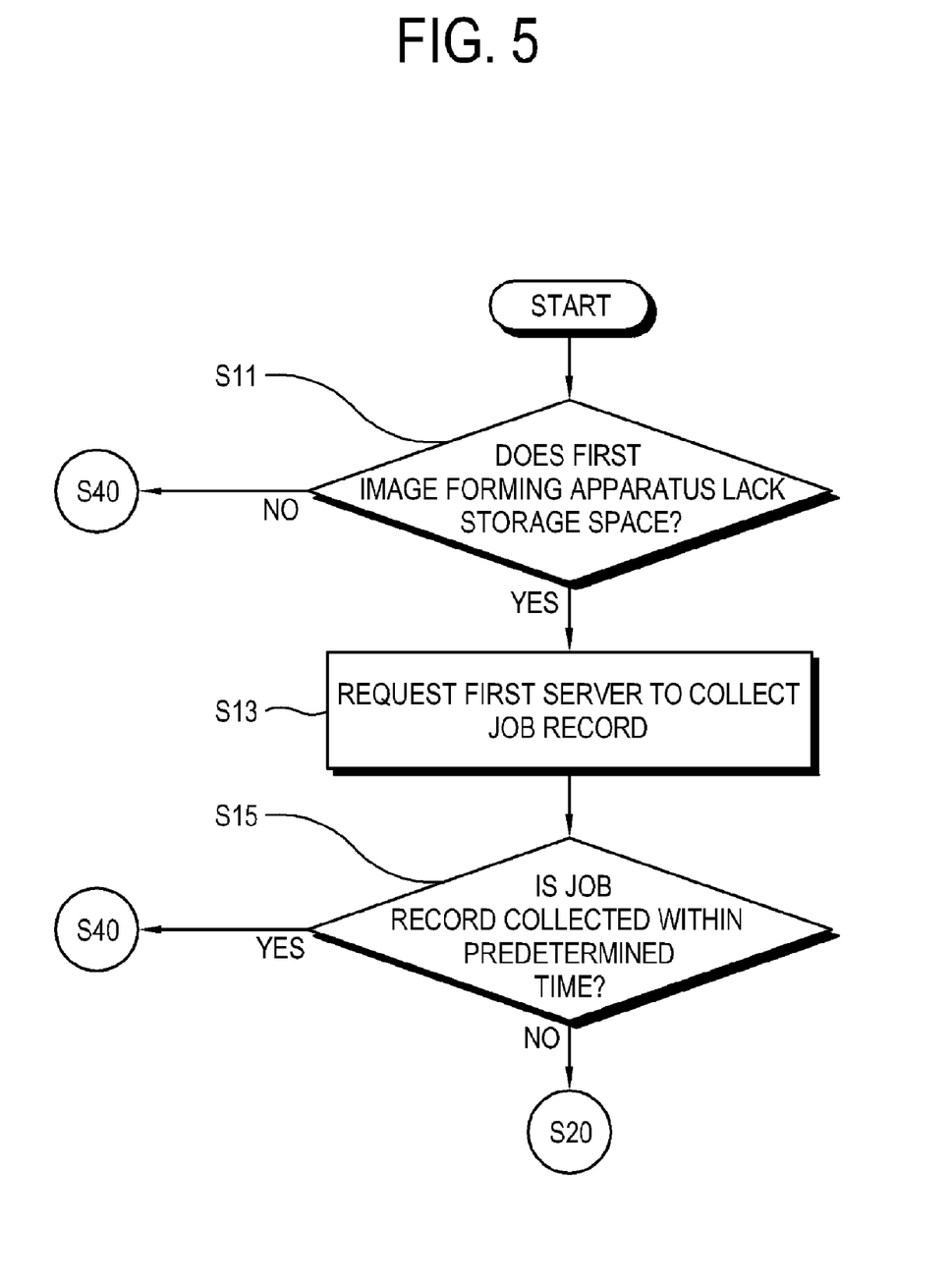
FIG. 5 is a flowchart of determining whether a first server operates normally in FIG. 4.

Referring to FIG. 5, determining whether the first server operates normally includes determining whether the storage space of the first image forming apparatus 10a is enough to store the job records (operation S11); the first image forming apparatus 10a requests the first server 21 to collect the job record if the first image forming apparatus 10a lacks the storage space (operation S13); and determining whether the first server 21 collects the job record within a predetermined time after the first image forming apparatus 10a requests the first server 21 to collect the job record (operation S15). In the operation S15, if the first server 21 collects the job record within the predetermined time, the operation S40 proceeds. Otherwise, a determination is made that the first server 21 operates abnormally, and thus the operation S20 proceeds. Here, the operation S10 of determining whether the first server operates normally may be achieved by various methods besides the operations described with reference to FIG. 5.

For example, whether the first server operates normally may be determined by the first server 21.

In the operation S20, at least one image forming apparatus including the first image forming apparatus 10a makes a request for the management or the first server 21 makes a request for the management. In the operation S20, another server designates at least one server among the plural servers besides the first server 21.

If the first server 21 makes the request for the management, the second server 23 informs at least one image forming apparatus, managed by the first server 21, of the operation state of the first server 21.

Further, the operation S30 includes selecting one that first responds to the request, e.g., the second server 23 among the servers requested to manage the first image forming apparatus 10a (operation S31); and managing the first image forming apparatus 10a through the second server 23 (operation S35). The operation S35 may further include deleting the job record stored in the image forming apparatus 10a after the second server 23 collects the job record from the first image forming apparatus 10a.

Further, the managing method according to this embodiment may include that the second server 23 notifies the manager that the first server 21 operates abnormally (operation S50). Here, the notification may be implemented through E-mail, short message service (SMS), really simple syndication (RSS), etc.

Also, the managing method according to this embodiment may include determining whether the first server 21 is recovered from the abnormal state (operation S60); and transferring the job records collected by the second server 23 to the first server 21 (operation S70).

Figure 6:
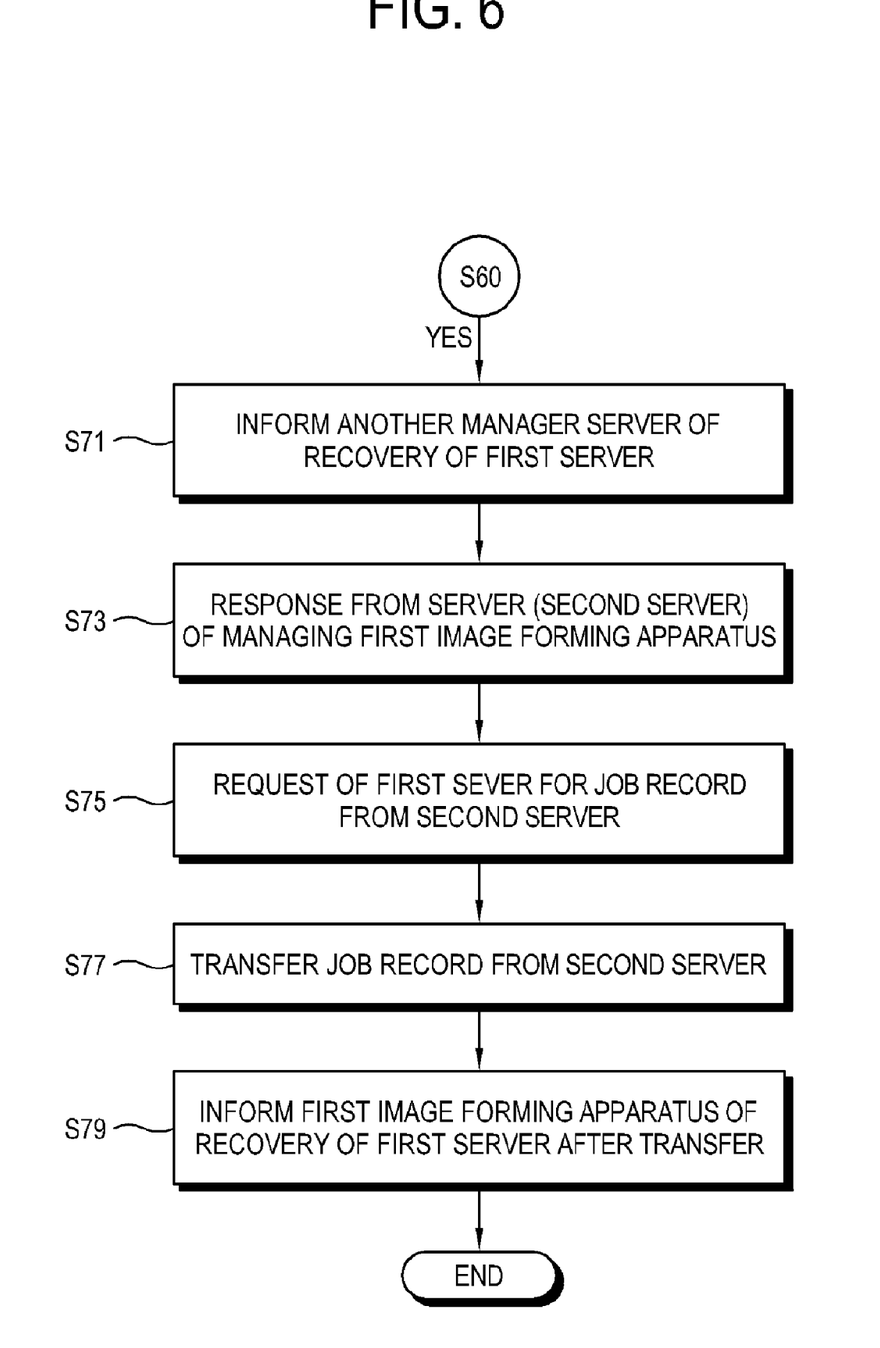
FIG. 6 is a flowchart of transferring job records in FIG. 4.

Referring to FIG. 6, the operation S70 of transferring the job record includes informing the plurality of servers 20 including the second server 23 of the recovery of the first server 21 (operation S71); the second server 23 responds to the first server 21 (operation S73); the first server 21 requests the job records from the second server 23 (operation S75); and the second server 23 transfers the job records to the first server 21 (operation S77).

In addition, the operation S70 may include informing the first image forming apparatus 10a of the recovery of the first server 21 after the first server 21 receives the job records from the second server 23 (operation S79).

Meanwhile, in the image forming system, a managing method according to an exemplary embodiment of the present general inventive concept will be described with reference to FIGS. 2, 3 and 7.

Figure 7:
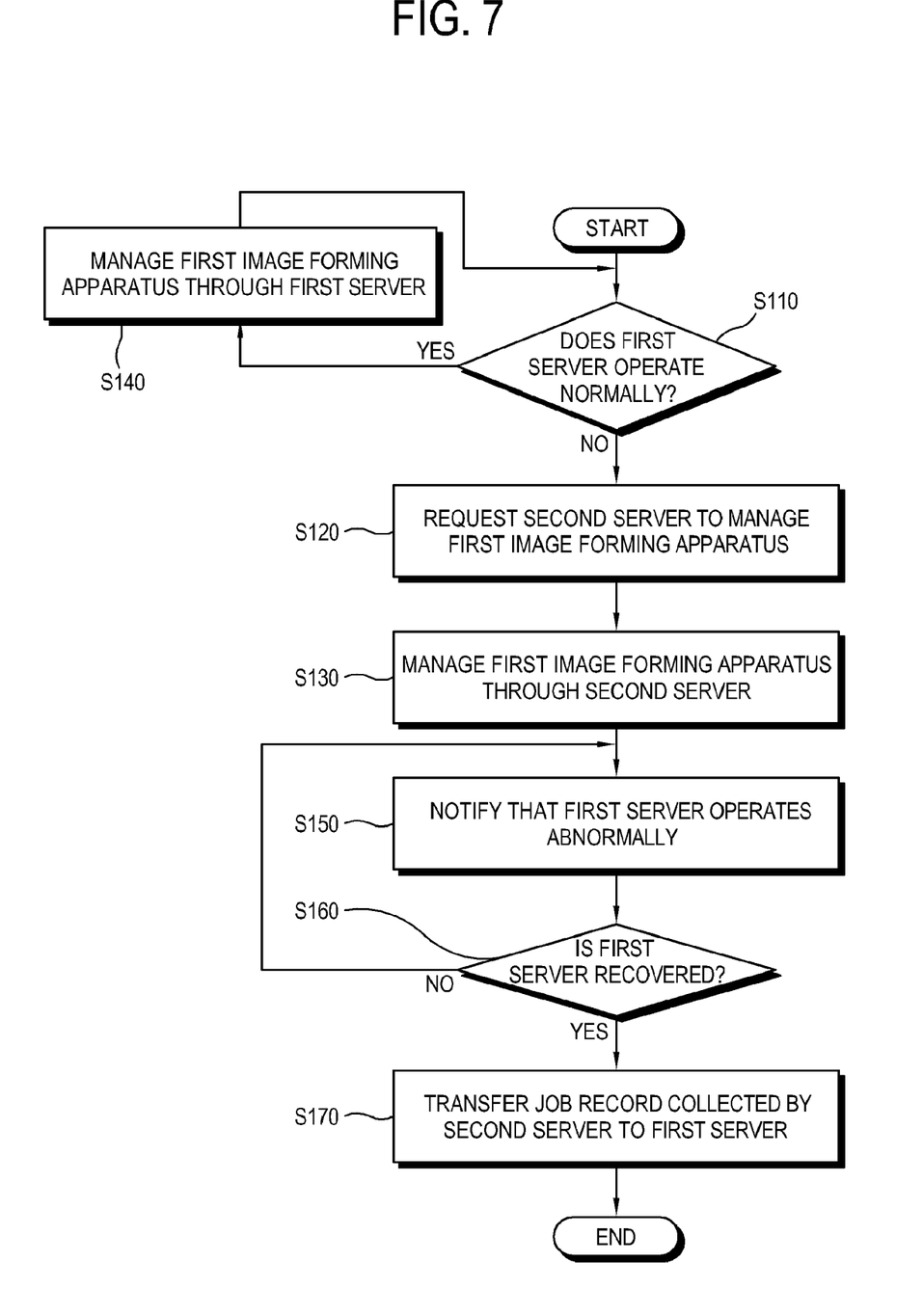
FIG. 7 is a flowchart of managing the image forming system according to an exemplary embodiment of the present general inventive concept.

The image forming system to which the managing method according to the exemplary embodiment of FIG. 7 is applied includes a plurality of image forming apparatuses 10 including the first image forming apparatus 10a, and the plurality of servers 20 including the first server 21 used as the main server to manage the first image forming apparatus 10a and the second server 23 used as the auxiliary server to auxiliarily manage the first image forming apparatus 10a.

As compared with the image forming system according to the exemplary embodiment of FIG. 2, the image forming system according to the exemplary embodiment of FIG. 7 is different in that the second server 23 is designated as the auxiliary server to manage the first image forming apparatus 10a.

FIG. 7 is a flowchart of managing the image forming system according to a second exemplary embodiment of the present general inventive concept.

Referring to FIG. 7, the managing method in the image forming system according to the present exemplary embodiment of the present general inventive concept includes determining whether the first server 21 operates normally (operation S110); requesting the auxiliary server, i.e., the second server 21 to manage the first image forming apparatus 10a when the first server 21 make trouble (operation S120); and managing the first image forming apparatus 10a through the second server 23 (operation S130). Here, if a determination is made that the first server 21 operates normally, the first server 21 is continuously used in managing the first image forming apparatus 10a (operation S140).

The operation S110 that determines whether the first server operates normally is substantially equal to the stage 10 of the exemplary embodiment of FIG. 2, and thus repetitive descriptions will be avoided.

In the operation S120, the first image forming apparatus 10a or the first server 21 makes a request for the management.

The operation S130 may further include deleting the job record stored in the image forming apparatus 10a after the second server 23 collects the job record from the first image forming apparatus 10a.

Further, the managing method according to this embodiment may include that the second server 23 notifies the manger that the first server 21 operates abnormally (operation S150).

Also, the managing method according to this embodiment may include determining whether the first server 21 is recovered from the abnormal state (operation S160); and transferring the job records collected by the second server 23 to the first server 21 (operation S170). The operation S170 of transferring the job records is substantially equal to the operation S70 of the exemplary embodiment of FIG. 2, and thus repetitive descriptions will be avoided.

In the managing method of the image forming system with the foregoing configuration, even though some servers are under the abnormal state, other servers may be used to temporarily manage the image forming apparatus, thereby preventing the job records from loss. Thus, the managing server is improved in stability.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, the present general inventive concept provides an image forming system and a managing method thereof, in which, even though a managing server for an image forming apparatus is abnormal, the image forming apparatus is managed by another server. Thus, the managing server is improved in stability, so that a plurality of image forming apparatuses can be managed without loss of job records.

Although various exemplary embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A managing method of an image forming system comprising at least one image forming apparatus including a first image forming apparatus, and a plurality of servers including a first server and managing the first image forming apparatus, the managing method comprising:
   determining whether the first server operates normally;
   requesting the plurality of servers excluding the first server, to manage the first image forming apparatus, if the first server operates abnormally;
   allowing a second server among the plurality of servers, excluding the first server, to manage the first image forming apparatus in response to the request; and
   transferring a job record collected by the second server to the first server when the first server is recovered, the transferring including:
      informing the plurality of servers including the second server of recovery of the first server;
      the second server responding to the first server;
      the first server requesting the job record from the second server; and
      the second server transferring the job record.

2. The managing method according to claim 1, wherein at least one of the first server and at least one image forming apparatus managed by the first server makes the request for the management.

3. The managing method according to claim 2, wherein, if the first server makes the request for the management, the second server informs at least one image forming apparatus managed by the first server of an operation state of the first server.

4. The managing method according to claim 1, further comprising:
   the second server notifying a manager that the first server operates abnormally.

5. The managing method according to claim 1, wherein at least one of the first server and the second server informs the plurality of servers that the first server is recovered.

6. A managing method of an image forming system comprising at least one image forming apparatus including a first image forming apparatus, and a plurality of servers including a first server used as a main server to manage the first image forming apparatus and a second server used as an auxiliary server to manage the first image forming apparatus, the managing method comprising:
   determining whether the first server operates normally;
   requesting the second server to manage the first image forming apparatus, if the first server operates abnormally;
   the second server managing the first image forming apparatus in response to the request; and
   transferring a job record collected by the second server to the first server when the first server is recovered, the transferring including informing the first image forming apparatus of recovery of the first server after the first server receives the job record from the second server.

7. The managing method according to claim 6, wherein the request comprises that the first image forming apparatus or the first server makes the request for the management.

8. An image forming system, comprising:
at least one image forming apparatus including a first image forming apparatus; and
a plurality of servers including a first server of managing the first image forming apparatus,
at least one of the first image forming apparatus and the first server determining whether the first server operates normally, and requesting the plurality of servers excluding the first server to manage the first image forming apparatus if the first server operates abnormally, and
a second server, among the plurality of servers excluding the first server, managing the first image forming apparatus in response to the request, the second server to inform the first image forming apparatus of recovery of the first server after the first server receives a job record from the second server.

9. The image forming system according to claim 8, wherein each image forming apparatus comprises:
an image forming unit to perform at least one of printing, scanning, copying and facsimileing functions;
a storage unit to store the job record and a job index of the image forming unit; and
a controller to control the image forming unit and the storage unit and to communicate with the plurality of servers, and
the controller of the first image forming apparatus controls the storage unit of the first image forming apparatus to delete the job record stored therein after the second server collects the job record from the first image forming apparatus.

10. An image forming system, comprising:
at least one image forming apparatus including a first image forming apparatus; and
a plurality of servers including a first server used as a main server to manage the first image forming apparatus and a second server used as an auxiliary server to manage the first image forming apparatus,
at least one of the first image forming apparatus and the first server determining whether the first server operates normally, and requesting the second server to manage the first image forming apparatus, if the first server operates abnormally, and
the second server managing the first image forming apparatus instead of the first server, the second server to inform the first image forming apparatus of recovery of the first server after the first server receives a job record from the second server.

11. The image forming system according to claim 10, wherein each image forming apparatus comprises:
an image forming unit to perform at least one of printing, scanning, copying and facsimileing functions;
a storage unit to store the job record and a job index of the image forming unit; and
a controller to control the image forming unit and the storage unit and to communicate with the plurality of servers, and
the controller of the first image forming apparatus controls the storage unit of the first image forming apparatus to delete the job record stored therein after the second server collects the job record from the first image forming apparatus.

12. An image forming system, comprising:
a plurality of image forming apparatuses; and
a plurality of servers coupled to the plurality of image forming apparatuses through a network, and to selectively manage the image forming apparatuses,
wherein a server is subsequently selected to manage a respective image forming apparatus when an operation of a server previously assigned to the respective image forming apparatus is determined to be abnormal, and the subsequently selected server informs the image forming apparatus of recovery of the previously assigned server after the previously assigned server receives a job record from the subsequently selected server.

13. The image forming system according to claim 12, wherein the operation of the previously assigned server is determined to be abnormal based on the server previously assigned not being able to complete a requested job record collection operation within a predetermined time.

* * * * *